March 21, 1939.  L. LEITZ  2,151,124

COMBINED RANGE FINDER AND VIEW FINDER

Filed Sept. 2, 1936

Ludwig Leitz
INVENTOR

BY Ivan E. A. Konigsberg
ATTORNEY

Patented Mar. 21, 1939

2,151,124

UNITED STATES PATENT OFFICE

2,151,124

COMBINED RANGE FINDER AND VIEW FINDER

Ludwig Leitz, Wetzlar, Germany, assignor to Ernst Leitz, G. m. b. H., Wetzlar, Germany Application September 2, 1936, Serial No. 99,033
In Germany September 5, 1935

1 Claim. (Cl. 95—44)

This invention relates to improvements in photographic apparatus of the kind which consists in a combination of a range finder and a terrestrial view finder arranged to form an integral part of a photographic camera.

The object of the invention is to provide a generally improved device of this character distinguished by the feature that the range finder and the view finder have a common optical axis and in that the movable optical element of the range finder consists of a fixed and a movable lens having symmetrical cooperating curved surfaces arranged to form an adjustable optical wedge for bending the incoming light rays for range finding purposes. Such an optical body possesses the advantage that all the incoming light rays are refracted into the range finder whereas prior disclosures which utilize for instance, a dove prism for such purpose, reflect only a portion of the incoming light rays. Another object of the invention is to locate the said optical wedge in the optical axis of the view finder whereby a more simplified compact construction is obtained of particular advantage in small cameras.

Figure 1:
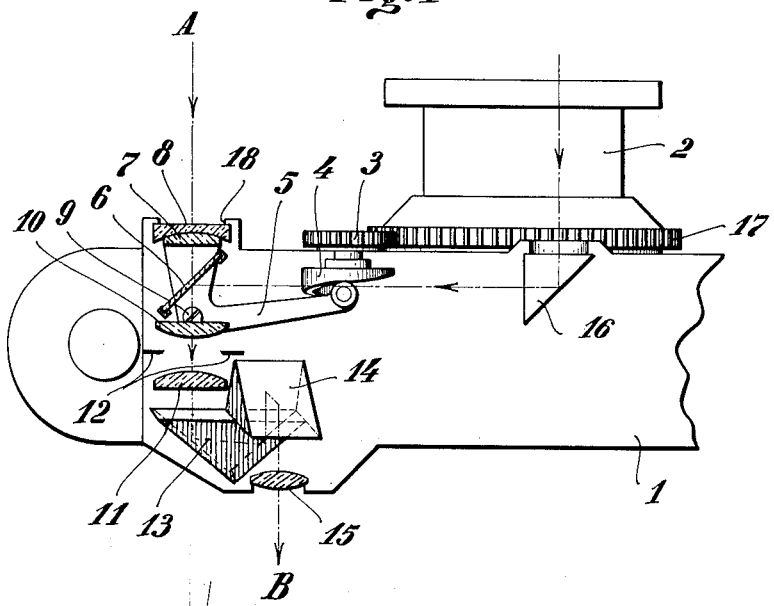
Figure 2:
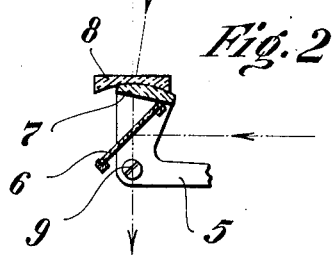

The accompanying drawing is a diagrammatic illustration of one embodiment of the invention, in which Fig. 1 is a plane view partly in section and Fig. 2 is a detail of Fig. 1 in another position of adjustment. In the drawing the objective 2 of the camera 1 is provided with a gear 17 which meshes with a pinion 3 for rotating a cam 4. The numeral 5 denotes a bell crank which is pivoted at 9 and which is oscillated on the pivot in a known manner as illustrated. The bell crank carries a lens 7 having an outer curved surface which slides along a similar inner curved surface of a fixed lens 8. The two lenses 7 and 8 form together an optical body for bending the incoming light rays admitted through the opening at 18.

The range finder comprises the fixed prism 16 and the fixed, partly transparent mirror 6. The terrestrial view finder consists of the lenses 10 and 11 with a mask 12 for limiting the field of view. Two other prisms 13 and 14 serve to reverse the picture so that it appears right side up. These two prisms are shown slightly in perspective for the sake of clearness. The paths of the rays of light are indicated by the dotted lines. The lens 15 represents the exit pupil of the system.

When the objective is focussed, the cam 4 is rotated and oscillates the bell crank on the pivot 9. Hence the inner swingable lens 7 is displaced or moved with reference to the outer fixed lens 8. The incoming rays are therefore bent in passing through the two lenses. When the picture seen through the view finder coincides with the reflected picture in the mirror 6, the range may be measured in a known manner by means of a scale, not shown.

The optical observation axis of the system is represented by the dotted line A—B. The construction and operation of the device will be fully understood by persons skilled in the art without any further description.

I claim:—

In a photographic camera in combination with an objective, an image erecting terrestrial prism view finder and a basis range finder including separate light admitting openings for said finders and an eye opening common to both finders, the view finder comprising an objective lens system and an ocular lens system including an image erecting prism system, a field mask between said objective and ocular systems for framing the field of view, the objective lens system including a fixed negative lens and a movable positive lens with similar radii of curvature adapted to form an optical wedge for deflecting the incoming light ray through the said view finder opening, the basis range finder including a fixed prism for deflecting the incoming light ray through the range finder opening, a fixed semi-transparent mirror in the optical axis of the view finder for combining the light rays through the said light admitting openings, a movable support for the said movable lens, said movable support being movable about a pivot in and perpendicular to the optical axis of the view finder and means engaging said movable support to move the same and the movable lens thereon when the camera objective is being focused.

LUDWIG LEITZ.